United States Patent
Campbell et al.

[15] 3,666,764
[45] May 30, 1972

[54] SPIROINDENYLPIPERIDINES

[72] Inventors: Kenneth N. Campbell, Evansville, Ind.; Donald E. Rivard, Medford Lakes, N.J.

[73] Assignee: Mead Johnson & Company, Evansville, Ind.

[22] Filed: Aug. 26, 1970

[21] Appl. No.: 67,228

[52] U.S. Cl. ..................260/293.62, 260/570.8 R, 424/267
[51] Int. Cl. ...........................................C07d 29/12
[58] Field of Search..............................260/293.62

[56] References Cited

FOREIGN PATENTS OR APPLICATIONS 1,335,831  7/1963  France..............................260/293.62

*Primary Examiner*—Henry R. Jiles
*Assistant Examiner*—G. Thomas Todd
*Attorney*—Pendleton, Neuman, Williams & Anderson and Robert E. Carnahan

[57] ABSTRACT

A class of compounds comprised of 3-phenylspiroindenylpiperidines having substituents on the piperidine nitrogen selected from the group consisting of hydrogen, lower alkyl, benzyl, and phenethyl have been discovered. These compounds are useful as local anesthetic agents. One method of preparation is by heating 1,1-bis(2-dialkylaminoethyl)-3-phenylindenes to eliminate trialkylamines. Subsequent dealkylation provides 3-phenylspiro [indene-1,4'-piperidine] which is reacted with an ester having the formula RX wherein X is a reactive leaving group and R is the desired piperidine substituent. Illustrative of the embodiments are 3-phenyl-spiro[indene-1,4'-piperidine] and 1'-methyl-3-phenyl-spiro[indene-1,4'-piperidine].

7 Claims, No Drawings

SPIROINDENYLPIPERIDINES

SUMMARY OF THE INVENTION

The present invention is particularly concerned with spiroindenylpiperidines of Formula I, and non-toxic pharmaceutically acceptable acid addition salts thereof.

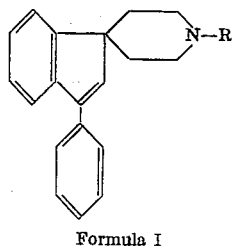

Formula I

These substances, characterized by Formula I, are new compositions of matter which possess local anesthetic properties.

In the foregoing Formula I, the piperidine moiety can be substituted with various R groupings including hydrogen, lower alkyl of one to four carbon atoms inclusive, benzyl, and phenethyl. By the term "lower alkyl" as employed herein it is meant straight or branched chain alkyl radicals including methyl, ethyl, propyl, isopropyl, 1-butyl, 1-methylpropyl, 2-methylpropyl, and tert.-butyl.

As used herein, the term "non-toxic pharmaceutically acceptable acid addition salts" refers to salts of compounds of Formula I with a variety of relatively non-toxic inorganic or organic acids such as sulfuric, phosphoric, hydrochloric, hydrobromic, hydroiodic, sulfamic, methanesulfonic, benzenesulfonic, para-toluenesulfonic, acetic, lactic, succinic, maleic, tartaric, citric, gluconic, ascorbic, benzoic, cinnamic, and related acids.

Preparation of pharmaceutically acceptable acid addition salts of the compounds of the present invention is accomplished by admixture of the bases with substantially one chemical equivalent of any of the various acids hereinabove defined. Generally, the salts are prepared in an inert solvent such as water, ether, benzene, ethanol or ethyl acetate.

The compounds of the present invention are synthesized according to a unitary process which comprises the following steps. Heating 1,1-bis(2-dimethylaminoethyl)- 3-phenylindene so that trimethylamine is eliminated or reacting 3-phenylindene with bis(2-chloroethyl)benzylamine to provide a spiroindenylpiperidine having Formula II

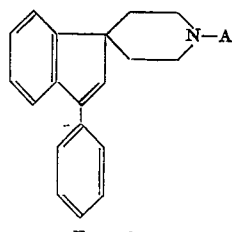

Formula II wherein A is methyl or benzyl. Converting the spiroindenylpiperidine of Formula II by known means such as heating with ethyl chloroformate to form an ethyl carbamate and hydrolyzing the ethyl carbamate to 3-phenylspiro[indene-1,4'-piperidine]. Reacting 3-phenylspiro[indene-1,4'-piperidine] with an ester having the formula RX wherein R is as defined above and X is a reactive leaving group selected from the group consisting of halides, in particular, chlorine and bromine, lower alkoxy and sulfate to provide spiroindenylpiperidines of Formula I.

The unitary process of the present invention for the preparation of the compounds of Formula I is further illustrated as follows. Pyrolysis of 1,1-bis(2-dimethylaminoethyl)-3-phenylindene (III) according to Equation 1 provides 1'-methyl-3-phenylspiro[indene-1,4'-piperidine] (IV).

EQUATION 1

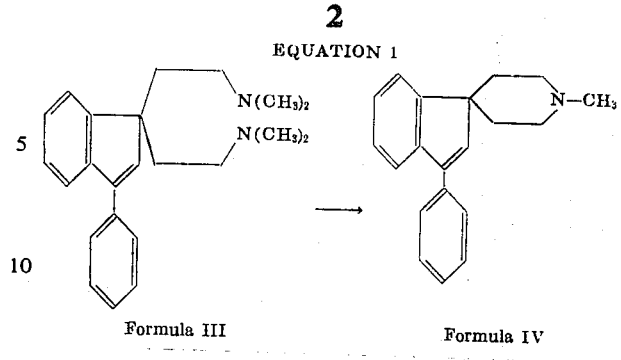

Formula III   Formula IV

The starting material 1,1-bis(2-dimethylaminoethyl)-3-phenylindene (III) is prepared by the method discussed by C. R. Ganellin et al., Chem. and Ind., (London) 1256 (1965). Ganellin's method is generally suitable for the preparation of analogous 1,1-bis(2-dialkylaminoethyl)-1-phenylindenes and 1,1-bis(2-diaralkylaminoethyl)-3-phenylindenes which can be pyrolytically cyclized according to the present invention to provide alkyl and aralkyl substituted spiroindenes of Formula I such as 1'-ethyl-3-phenylspiro[indene-1,4'-piperidine],
1'-isopropyl-3-phenylspiro[indene-1,4'-piperidine],
1'-benzyl-3-phenylspiro[indene-1,4'-piperidine],
1'-phenethyl-3-phenylspiro[indene-1,4'-piperidine].

Alternatively, spiroindenylpiperidines of Formula I wherein R is alkyl or aralkyl including benzyl and phenethyl can be prepared as illustrated in Equation 2 wherein alkylation of 3-phenylindene (V) with bis(2-chloroethyl)benzylamine and sodamine in liquid ammonia provides 1'-benzyl-3-phenylspiro-[indene-1,4-piperidine] (VI).

EQUATION 2

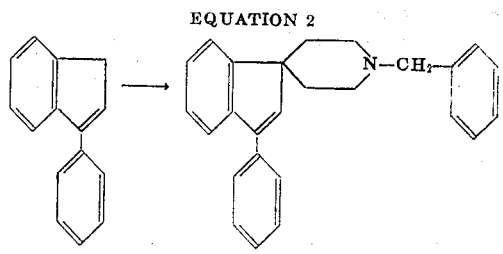

Formula V   Formula VI

This method is applicable to preparation of other "1'-substituted" phenylspiroindenylpiperidines and provides another method of obtaining 1'-methyl-3-phenylspiro[indene-1,4'-piperidine],
1'-ethyl-3-phenylspiro[indene-1,4'-piperidine],
1'-isopropyl-3-phenylspiro[indene-1,4'-piperidine],
1'-tert.-butyl-3-phenylspiro[indene-1,4'-piperidine],
1'-phenethyl-3-phenylspiro[indene-1,4'-piperidine].

Treatment of 1'-methyl-3-phenylspiro[indene-1,4'-piperidine] (VII) with ethyl chloroformate affords ethyl 3-phenylspiro[indene-1,4'-piperidine]-1'-carboxylate (VIII) which is subsequently hydrolyzed to 3-phenylspiro[indene-1,4'-piperidine] (IX) with base. These transformations are illustrated in Equation 3.

EQUATION 3

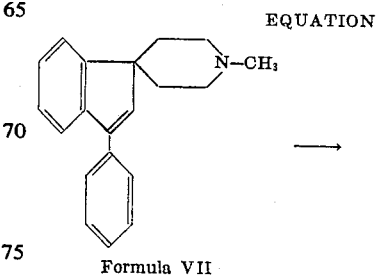

Formula VII

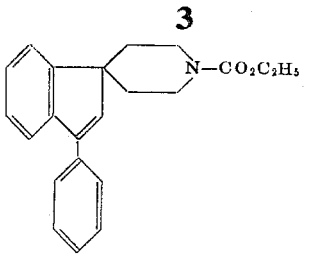

Formula VIII

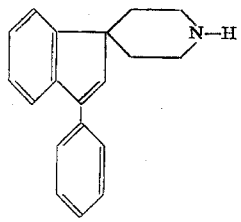

Formula IX

Acylation of 3-phenylspiro[indene-1,4'-piperidine] (IX) with acyl halides such as acetyl chloride, secondary butyryl chloride, benzoyl chloride, phenylacetyl chloride followed by reduction of the amide intermediates thus obtained with lithium aluminum hydride yields spiroindenylpiperidines of Formula I including 1'-phenethyl-3-phenylspiro[indene-1,4'-piperidine],
1'-benzyl-3-phenylspiro[indene-1,4'-piperidine],
1'-ethyl-3-phenylspiro[indene-1,4'-piperidine],
1'-isobutyl-3-phenylspiro[indene-1,4'-piperidine].

Alkylation of 3-phenylspiro[indene-1,4-piperidine] with tert.-butyl chloride provides 1'-tert.-butyl-3-phenylspiro[indene-1,4'-piperidine].

The compounds of the present invention exhibit local anesthetic activity according to the test of Hirschfelder and Bieter, Physiol. Rev. 12, 190, (1932). In this test, different concentrations of the test compound are topically administered to the cornea of rabbits and the concentration necessary to anesthetize the cornea and thus abolish the corneal reflex is determined. Exemplary of the local anesthetic activity obtained with the compounds of the present invention is that exhibited by 1'-methyl-3-phenylspiro[indene-1,4'-piperidine] hydrochloride and 3-phenylspiro[indene-1,4'-piperidine] hydrochloride hydrate. The concentration values for 50 percent reduction of the corneal reflex ($EC_{50}$) for the former is 0.01 percent (weight/volume) and for the latter 0.07 percent (weight/volume). Procaine hydrochloride which is a well-known local anesthetic has an $EC_{50}$ of 0.14 percent in this test.

Topical and subcutaneous administration of the compounds of the present invention to mammals produce local anesthetic effects. Concentrations of the order of about 0.05 to about 0.5 percent are satisfactory for topical local anesthetic use in the eye. When used as a spray, or when applied by means of cotton applicators or packs or administered subcutaneously, as well as when instilled into a cavity, the preferred dosage of the compounds of the present invention is 0.5 ml. to 5 ml. of a 4 percent solution which is equivalent to 20 mg. to 200 mg. In dentistry, the compounds of the present invention are swabbed onto previously dried oral mucosa prior to many odontological procedures preferably employing no more than a total volume of 5 ml. of 4 percent solution.

The compounds of Formula I may be compounded and formulated with organic or inorganic solid materials or liquids which are pharmaceutically acceptable carriers to provide pharmaceutical compositions of unit dosage form suitable for administration to mammals. Pharmaceutical compositions considered within the scope of the invention may take the form of powder, granules, suspensions, solutions and the like. Suitable pharmaceutical carriers comprise both solids and liquids such as corn starch, lactose, calcium phosphate, stearic acid, polyethylene glycol, water, sesame seed oil, peanut oil, propylene glycol, and so forth.

The following examples illustrate the best mode contemplated for carrying out the present invention. They are merely illustrative and are not to be construed as limiting the scope of the claims in any manner whatsoever. Example 1. 1'-Methyl-3-phenylspiro[indene-1,4'-piperidine].— A mixture of 1,1-bis(2-dimethylaminoethyl)-3-phenylindene (5.0 g., 0.0148 mole) and the dihydrochloride salt thereof (6.0 g., 0.0148 mole) prepared according to C. R. Ganellin et al., Chem. and Ind., (London), 1256 (1965) is heated under water-pump vacuum at 270°–280° C. for a 10 minute period. The pyrolized product is dissolved in chloroform, the chloroform solution shaken with 10 percent sodium hydroxide, the chloroform layer separated, washed with water and dried over anhydrous potassium carbonate. Evaporation of the chloroform solvent provides 1'-methyl-3-phenylspiro[indene-1,4'-piperidine] as the free base which is purified by distillation and has a boiling point of 151°–155° C. at 0.2 mm. Hg., $n_D^{20}$ 1.6069.

Analysis. Calcd. for $C_{20}H_{21}N$: C, 87.22; H, 7.69; N, 5.09. Found: C, 87.59; H, 7.52; N, 5.12.

The free base in isopropanol is treated with ethanolic hydrogen chloride to provide the hydrochloride salt thereof. Crystallization of the salt from isopropanol:isopropyl ether yields analytically pure 1'-methyl-3-phenylspiro[indene-1,4'-piperidine] hydrochloride which has a melting point of 292°–294° C. (dec.).

Analysis. Calcd. for $C_{20}H_{22}ClN$: C, 77.02; H, 7.11; Cl, 11.37. Found: C, 77.15; H, 6.98; Cl, 11.21.

Example 2. 3-Phenylspiro[indene-1,4'-piperidine] hydrochloride hydrate.— A solution of 1'-methyl-3-phenylspiro[indene-1,4'-piperidine] (17.6 g., 0.64 mole) in 30 ml. of benzene is added dropwise with stirring to ethyl chloroformate (21.7 g., 0.2 mole) in 20 ml. of benzene. After refluxing the mixture for 6 hr., sufficient 1:1 water-ether is added until solids are dissolved. The organic phase is separated and extracted with 3N hydrochloric acid and dried over magnesium sulfate. Evaporation of the solvents yields 15.4 g. (72 percent yield) of crude product which is crystallized from absolute ethanol to provide 13.6 g. (64 percent) of ethyl 3-phenylspiro[indene-1,4'-piperidine]-1'-carboxylate.

Analysis. Calcd. for $C_{22}H_{23}NO_2$: C, 79.25; H, 6.95; N, 9.60. Found: C, 79.55; H, 6.55; N, 9.90.

A solution of ethyl 3-phenylspiro[indene-1,4'-piperidine]-1'-carboxylate (12.5 g., 0.038 mole) in 80 ml. of ethanol containing 50 g. of potassium hydroxide is refluxed under nitrogen for 10 hr. The mixture is diluted with water, and concentrated under vacuum to remove ethanol. The resulting aqueous mixture is extracted with two 100 ml. portions of ether. Shaking the combined ethereal extracts with 2N hydrochloric acid provides a precipitate which is collected, weight 10.3 g., melting point 220°–223° C. Crystallization of this material from 95 percent ethanol affords 9.2 g. (76 percent yield) of 3-phenylspiro[indene-1,4'-piperidine] hydrochloride hydrate.

Analysis. Calcd. for $C_{19}H_{22}ClNO$: C, 72.25; H, 7.02; Cl, 11.23; $H_2O$, 5.71. Found: C, 72.52; H, 7.30; Cl, 10.98; $H_2O$, 6.01.

Example 3. 1'-Phenethyl-3-phenylspiro[indene-1,4'-piperidine] hydrochloride.— A slurry of 3-phenylspiro-[indene-1,4'-piperidine] hydrochloride hydrate (0.02 mole) in 50 ml. of benzene is neutralized with 10 percent sodium hydroxide by stirring until the hydrochloride salt dissolves. The benzene layer is separated and dried over potassium carbonate. Evaporation of the benzene solution under vacuum provides the free base which is taken up in 50 ml. of hot pyridine. Phenylacetyl chloride (3.4 g., 0.022 mole) dissolved in 25 ml. of benzene is added and the pyridine mixture heated for 2 hr. at 100° C. after which it is poured into 500 ml. of water and the aqueous pyridine mixture extracted with three 50 ml. portions of benzene. The combined benzene extracts are washed with dilute hydrochloric acid and then dried over potassium carbonate. Evaporation of the benzene solvent provides 1'-phenacetyl-3-phenylspiro[indene-1,4'-piperidine].

A tetrahydrofuran solution (20 ml.) of 1'-phenacetyl-3-phenylspiro[indene-1,4'-piperidine] (0.011 mole) is added to a slurry of lithium aluminum hydride (0.5 g., 0.013 mole) in 30 ml. of tetrahydrofuran. The mixture is refluxed for 20 hr. and then decomposed with water and 15 percent sodium hydroxide. The hydrolyzed mixture is filtered and the filtrate concentrated under vacuum to provide a residue which is extracted first with water and then with 1N hydrochloric acid. Concentration of the acid extract provides 1'-phenethyl-3-phenylspiro[indene-1,4'-piperidine] hydrochloride.

Example 4. 1'-Benzyl-3-phenylspiro[indene-1,4'-piperidine] hydrochloride.— A solution of 3-phenylindene (19.2 g., 0.1 mole) in 100 ml. of ether is added to 1.5 l. of liquid ammonia to which sodium (5.1 g., 0.22 mole) had been previously dissolved. After stirring the mixture for 1.5 hr. a solution of bis(2-chloroethyl)benzylamine (28.5 g., 0.1 mole) in 200 ml. of ether is added. This mixture is stirred for 24 hr. and the liquid ammonia then permitted to evaporate. Water is added to the resulting ethereal residue and the ethereal phase separated. Addition of 6N hydrochloric acid to the ether solution precipitates an oil which is separated and dissolved in chloroform. The chloroform solution is washed with water, dried over magnesium sulfate and evaporated to provide 12 g. of red oily solid. Trituration of the solid with acetone provides 4 g. of 1'-benzyl-3-phenylspiro[indene-1,4'-piperidine] hydrochloride, m.p. 276°–278° C.

M.P. 281°–285° C. (dec.) (corr.).

Analysis Calcd. for $C_{26}H_{26}ClN$: C, 80.50; H, 6.76; N, 3.61. Found: C, 80.40; H, 6.53; N, 3.68.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A compound selected from the group consisting of a compound having the formula

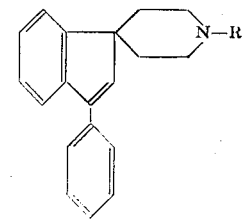

wherein
R is hydrogen, lower alkyl of one to four carbon atoms inclusive, benzyl, phenethyl; and a non-toxic pharmaceutically acceptable acid addition salt thereof.

2. The compound of the group defined in claim 1 which is 3-phenylspiro[indene-1,4'-piperidine].

3. The compound of the group defined in claim 1 which is 3-phenylspiro[indene-1,4'-piperidine] hydrochloride hydrate.

4. The compound of the group defined in claim 1 which is 1'-methyl-3-phenylspiro[indene-1,4'-piperidine].

5. The compound of the group defined in claim 1 which is 1'-methyl-3-phenylspiro[indene-1,4'-piperidine] hydrochloride.

6. The compound of the group defined in claim 1 which is 1'-benzyl-3-phenylspiro[indene-1,4'-piperidine].

7. The compound of the group defined in claim 1 which is 1'-benzyl-3-phenylspiro[indene-1,4'-piperidine] hydrochloride.

* * * * *